United States Patent [19]
Otaka et al.

[11] Patent Number: 4,818,317
[45] Date of Patent: Apr. 4, 1989

[54] METHOD FOR PRODUCING CERAMIC HONEYCOMB STRUCTURAL BODY

[75] Inventors: Masashi Otaka, Mie; Showji Asai, Nagoya, both of Japan

[73] Assignee: NGK Insulators, Ltd., Nagoya, Japan

[21] Appl. No.: 60,462

[22] Filed: Jun. 11, 1987

[51] Int. Cl.⁴ .............................................. C03B 29/00
[52] U.S. Cl. ........................................ 156/89; 55/523
[58] Field of Search ............................. 156/89; 55/523

[56] References Cited

U.S. PATENT DOCUMENTS

| | | | |
|---|---|---|---|
| 4,293,357 | 10/1981 | Higuchi et al. | 156/89 |
| 4,363,644 | 12/1982 | Sato et al. | 55/523 |
| 4,455,180 | 6/1984 | Hillman et al. | 156/89 |
| 4,559,193 | 12/1985 | Ogawa et al. | 156/89 |
| 4,568,402 | 2/1986 | Ogawa et al. | 156/89 |

FOREIGN PATENT DOCUMENTS 0042302 12/1981 European Pat. Off. .

Primary Examiner—Caleb Weston
Attorney, Agent, or Firm—Parkhurst, Oliff & Berridge

[57] ABSTRACT

A method for producing a highly reliable ceramic honeycomb structural body having selectively, tightly sealed open end surfaces, including steps of attaching a film or mask on an open end surface of a ceramic honeycomb structural body, introducing a ceramic sealing material, preferably having a viscosity of 50–1,500 poises, into throughholes of said honeycomb body through apertures bored at selected positions of the film or mask, rapidly drying to solidify the sealing material followed by sintering. The drying step takes place 2 minutes after the introduction of the sealing material into the throughholes and is performed, preferably with hot air at 100°–300° C.

21 Claims, 1 Drawing Sheet

METHOD FOR PRODUCING CERAMIC HONEYCOMB STRUCTURAL BODY

BACKGROUND OF THE INVENTION

1. Field of the Invention

The present invention relates to a method for producing a ceramic honeycomb filter which is used for removing fine particles in diesel engine exhaust gas or for chemical industries, or a ceramic honeycomb structural body for heat exchangers. More particularly, this invention relates to a method for sealing open ends of throughholes of the ceramic honeycomb structural body.

2. Description of the Prior Art

Regarding a method for sealing open ends of throughholes of the ceramic honeycomb structural body, there is known a method which comprises steps of attaching a film or mask on an open end surface of a ceramic honeycomb structural body, and introducing a ceramic sealing material into throughholes of the ceramic honeycomb structural body through apertures provided at selected positions of the film or mask, to seal an end portion of the throughholes of the ceramic honeycomb structural body (U.S. Pat. Nos. 4,293,357 and 4,559,193).

In U.S. Pat. No. 4,293,357, as the ceramic sealing materials, those having dilatancy are used, and U.S. Pat. No. 4,559,193 discloses a method comprising steps of dipping a honeycomb body in a slurry containing a sealing material and passing a pasty sealing material green body into throughholes of the honeycomb body.

However, the use of a dilatant sealing material has drawbacks in that a tight seal cannot be provided between partition walls defining the throughholes and the sealing material, because of a smaller diameter of apertures bored through the film as compared with the diameter of the throughholes of the ceramic honeycomb structural body, or the sealing material bridging the apertures of the film due to the dilatancy, which hinders a smooth introduction of the sealing material into the throughholes.

It is more effective for ensuring a tight sealing between partition walls and sealing layer to use a viscous slurry. However, the use of such a slurry has drawbacks in that an open pore is prone to be formed in the center portion of the sealing layer. In particular, for sealing of a porous ceramic honeycomb structural body, the drawbacks become more conspicuous because the sealing material penetrates through the pores of the porous ceramic body to draw the sealing layer towards the partition walls.

Therefore, the use of two phases of sealing materials, i.e., a viscous material and a dilatant material, has been proposed to ensure a tight sealing without forming the central hole. However, the use of two phases of sealing material requires two sealing steps, which is not suitable for mass production.

SUMMARY OF THE INVENTION

The present invention is aimed to eliminate the above-mentioned drawbacks of the prior art.

The object of the present invention is to provide a method for sealing, with a high reliability, an end portion of throughholes of a porous ceramic honeycomb structural body.

The above object can be attained by a method for producing a ceramic honeycomb structural body having selectively sealed open end surfaces, which method comprises steps of attaching a film or mask on an open end surface of a ceramic honeycomb structural body and introducing a ceramic sealing material into throughholes of the ceramic honeycomb structural body through apertures provided at selected positions of the film or mask, which is characterized in that drying of the sealing materal is commenced within 2 minutes after the introduction of said sealing material into the throughholes and completed with solidification of the sealing material.

BRIEF DESCRIPTION OF THE DRAWING

For a better understanding of the invention, reference is made to the accompanying drawing, in which.

DETAILED DESCRIPTION OF THE INVENTION

Figure 1:
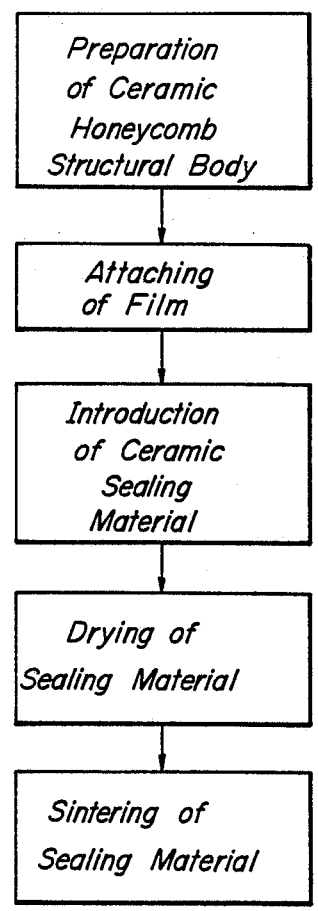
FIG. 1 is a flow sheet for illustrating the method of the present invention.

Referring to FIG. 1, in the first step, a ceramic honeycomb structural body is prepared. As a material for the ceramic honeycomb structural body, those having heat resistance, thermal shock resistance, etc., such as cordierite, alumina, mullite and the like, are selected depending on the use. Further, the form of the throughholes and the size and shape of the whole honeycomb body are generally decided also depending on the use. Since ceramic honeycomb structural bodies to which the method of the present invention is applied are mainly used as ceramic filters, etc., those having a throughhole density (the number of cells per cross-sectional unit area) of $2$-$100/cm^2$ are preferred in view of characteristics required for filters, such as filtration area and pressure loss.

As the preparation process, an extrusion molding is generally adopted and then a fired product or a greenware is prepared.

The next step is a step of attaching a film on an open surface of the ceramic honeycomb structural body. As the film, use may be made of either a film having apertures bored in advance at selected positions corresponding to desired throughholes to be sealed at an end portion with a sealing material, or a film having apertures bored at selected positions after the film has been attached. Additionally, in this step, not only a film but also a rubber mask having apertures bored in advance, may be used.

The following step is a most important step in the practice of the present invention, wherein the ceramic sealing material is introduced into selected throughholes through the apertures.

As a main ingredient (i.e., primary constituent) of the sealing material, the same material as that of the ceramic honeycomb structural body is preferably used, that is, for example, cordierite, alumina, mullite, etc. Other than these main ingredients, it contains a plasticizer, such as a binder, water, etc. As the binder, those rapidly solidifiable upon heating, such as methyl cellulose, polyvinyl alcohol, carboxymethyl cellulose, starch paste, polyethylene oxide, etc., are preferred, in order to rapidly dry the sealing material, as will be described hereinafter.

For example, when sealing material compositions of cordierite system are used, 100 parts by weight of cordierite powder or a mass formulated with predetermined raw materials such that after being fired the mass has substantially the same composition as the cordierite system, are admixed with a binder consisting of 0.2-5.0 parts by weight of methyl cellulose, 5-15 parts by weight of glycerine and 0.1-2 parts by weight of polyethylene oxide, and are further added and kneaded with 25-40 parts by weight of water as a plasticizer, and then the viscosity of the resultant is adjusted to a predetermined value to prepare a sealing material. The viscosity of the sealing material is selected depending on the throughhole size of the ceramic honeycomb structural body to be sealed. For example, by the throughhole density being 2 cells/cm$^2$, it is meant that the throughholes are of a relatively large size, such as having a polygonal cross-section with a side length of about 7 mm or a circular cross-section of about 7 mm in diameter. In this case, even a relatively high viscosity can be selected for the sealing material. However, when the viscosity is too low, there may be the case where a single step fails to seal. In that case, the sealing can be achieved by repeating the steps of the introduction of the sealing material and the subsequent drying and solidification.

On the other hand, by the throughhole density being, for example, 200 cells/cm$^2$, it is meant that the throughholes are of a small size, such as having a polygonal cross-section with a side length of about 1 mm or a circlar cross-section of about 1 mm in diameter. In this case, a relatively low viscosity is selected.

In the present invention, it is preferred that the viscosity of the sealing material is adjusted to be 50-1,500 poises, preferably 100-800 poises.

The reason why the above limited viscosity range is preferred is that, in the case of lower than 50 poises, a small hole tends to grow in the central portion of the seal at an end of the throughhole, though a good tightness is attained between the sealing material and the partition walls of the ceramic honeycomb structural body, while, if in excess of 1,500 poises, the tightness will be poor between the sealing material and the partition walls, and particularly when the throughholes have a square cross-section, the corners will not be able to be sealed tightly. The viscosity is adjusted with the viscosity and amount of main ingredients, the kind and amount of the binders, and a solvent such as water or the like.

As a means for introducing the ceramic sealing material into the throughholes, pressing, dipping, etc. are adopted. The introduction may be effected into each open end surface in an alternating manner or both the surfaces simultaneously.

The subsequent step is a step of drying the sealing material introduced into the throughholes.

The sealing material is dried immediately after the introduction thereof into the throughholes. The drying should be commenced within 2 minutes after the introduction of the sealing material.

The reason for the above is, when a porous ceramic honeycomb structural body is sealed, the sealing material tends to be more absorbed into the partition walls and the seal is not formed in the central portion and a small hole tends to be formed in the central portion. The tendency of the above drawbacks becomes remarkable, particularly when the viscosity is low. Therefore, sealing material must be dried and solidified in a short time after the introduction into the throughholes, before the sealing material is excessively absorbed into the pores of the porous ceramic honeycomb structural body. For example, when the viscosity is, for instance, 100-300 poises, the time from the pressing-in to the drying is preferably within 1 minute, more preferably within 30 seconds. The drying means is adequately selected in accordance with the properties of the sealing material, and a heating means such as hot air and gas burner, and an electric heating means such as nichrome heater, infra-red ray heater, and the like, may be adopted. As the drying temperature, a temperature of 100°-300° C. is preferred. This is because, when lower than 100° C., the drying is so insufficient that the sealing material may exfoliate by handling in the next step, or even if does not exfoliate, a drawback will be encountered such that the drying time is prolonged. Further, if higher than 300° C., the binders, or the like, contained in the sealing material will be eliminated so that an adhering strength of the sealing material to the throughholes is prone to decrease. Furthermore, when the ceramic honeycomb structural body is a greenware, i.e., a non-fired product, the elimination of the binders contained in the honeycomb structural body causes deterioration in strength of the honeycomb structural body, whereby cracking and chipping are likely to occur.

The drying time is selected so as to be sufficient for the sealed portion to solidify. It is set depending on the shape of the product, the drying temperature, the viscosity of the sealing material, etc., and generally 0.5-3 minutes.

The final step is a step of sintering the sealing material. When the ceramic honeycomb structural body is a sintered body, sintering conditions are determined depending on the main ingredient of the sealing material. For example, in the case of a cordierite system, sintering at 1,400° C. for 4 hours is preferred. On the other hand, when the ceramic honeycomb structural body is a greenware, the conditions are determined, taking the material, size and shape of the ceramic honeycomb structural body into account.

The following example is given for the purpose of illustration of this invention and is not intended as limitations thereof.

EXAMPLE

As ceramic honeycomb structural bodies, three kinds as shown in Table 1 were prepared. Then, the throughholes of the ceramic honeycomb structural bodies were sealed at an open end with sealing materials shown in Table 2, under conditions shown in Table 3.

Of the thus obtained ceramic honeycomb structural bodies having throughholes sealed at an open end, the sealed portions were checked with the naked eye by the aid of a light projector. The results are given in Table 4. As is apparent from those results, the sealed bodies produced by the method of the present invention are excellent.

TABLE 1

| | | | Dimension and Shape of Ceramic Honeycomb Body | | | | |
|---|---|---|---|---|---|---|---|
| No. | Material | State of Product | Dia. (mm) | Height (mm) | Wall Thickness (mm) | No. of cells (No./cm²) | Cross-section of cell |
| A | Cordierite | Fired | 144 | 150 | 0.4 | 15.5 | Square |
| B | Mullite | Fired | 120 | 150 | 0.3 | 31.0 | Square |
| C | Cordierite | Green | 120 | 150 | 0.4 | 15.5 | Square |

TABLE 2

(Unit: weight %)

| Composition | Main Ingredient | Methyl cellulose | Polyethylene oxide | Polyvinyl alcohol | Carboxymethyl cellulose | Glycerine | Water reducing agent | Water |
|---|---|---|---|---|---|---|---|---|
| a | Cordierite | 0.5 | 0.2 | — | — | 10 | 0.3 | 18~32 |
| b | Mullite | 1.0 | — | 5.0 | — | — | — | 40 |
| c | Cordierite | 0.5 | — | — | 3.0 | — | — | 40 |

TABLE 3(a)

| No. | Ceramic honeycomb structural body | Sealing material Composition | Viscosity (P) | Sealing Means | Time from pressing-in to commencement of drying of sealing material (sec.) | Conditions for drying Time (sec.) | Conditions for drying Means | Conditions for drying Temp. (°C.) | Conditions for firing Temp. (°C.) | Conditions for firing Time (hrs.) |
|---|---|---|---|---|---|---|---|---|---|---|
| 1 | B | b | 50 | Film | 15 | 60 | Electric heater | 250 | 1420 | 6 |
| 2 | C | c | 50 | Mask | 30 | 60 | Hot air | 300 | 1410 | 2 |
| 3 | A | c | 50 | Mask | 120 | 60 | Hot air | 400 | 1410 | 2 |
| 4 | B | a | 100 | Film | 120 | 60 | Electric heater | 250 | 1420 | 6 |
| 5 | A | a | 250 | Mask | 30 | 180 | Hot air | 80 | 1400 | 4 |
| 6 | A | a | 250 | Mask | 120 | 180 | Hot air | 80 | 1400 | 4 |
| 7 | A | a | 250 | Mask | 90 | 120 | Hot air | 100 | 1400 | 4 |
| 8 | A | a | 250 | Mask | 60 | 90 | Hot air | 200 | 1400 | 4 |
| 9 | C | c | 250 | Mask | 30 | 60 | Hot air | 300 | 1410 | 2 |
| 10 | B | b | 300 | Film | 15 | 60 | Electric heater | 250 | 1420 | 6 |
| 11 | B | b | 300 | Film | 30 | 60 | Electric heater | 250 | 1420 | 6 |
| 12 | B | b | 300 | Film | 60 | 60 | Electric heater | 250 | 1420 | 6 |
| 13 | B | b | 300 | Film | 120 | 60 | Electric heater | 250 | 1420 | 6 |
| 17 | B | b | 300 | Film | 240 | 60 | Electric heater | 250 | 1420 | 6 |

TABLE 3(b)

| No. | Ceramic honeycomb structural body | Sealing material Composition | Viscosity (P) | Sealing Means | Time from pressing-in to commencement of drying of sealing material (sec.) | Conditions for drying Time (sec.) | Conditions for drying Means | Conditions for drying Temp. (°C.) | Conditions for firing Temp. (°C.) | Conditions for firing Time (hr.) |
|---|---|---|---|---|---|---|---|---|---|---|
| 14 | B | b | 600 | Film | 30 | 60 | Electric heater | 250 | 1420 | 6 |
| 15 | A | a | 1500 | Mask | 90 | 120 | Hot air | 100 | 1400 | 4 |
| 18 | B | b | 1500 | Film | 240 | 60 | Electric heater | 250 | 1420 | 6 |
| 16 | C | c | 1500 | Mask | 30 | 60 | Hot air | 300 | 1410 | 2 |
| 19 | A | a | 30 | Mask | 30 | 120 | Hot air | 80 | 1400 | 4 |
| 20 | B | b | 30 | Film | 60 | 60 | Electric heater | 250 | 1420 | 6 |
| 21 | C | c | 30 | Mask | 30 | 60 | Hot air | 300 | 1410 | 2 |
| 22 | C | c | 30 | Mask | 15 | 60 | Hot air | 400 | 1410 | 2 |
| 23 | A | a | 2200 | Mask | 120 | 120 | Hot air | 80 | 1410 | 2 |
| 24 | C | c | 2200 | Mask | 120 | 60 | Hot air | 400 | 1410 | 2 |

(Notes)
(1) Nos. 17-24 are reference examples.
(2) Hot air: Air was heated with a nichrome heater and the hot air was passed to sealed surfaces.
(3) Electric heater: The sealed surface was placed to face to ignited surfaces of a nichrome heater and temperatures of the sealed surface and nichrome heater were set to predetermined values.

TABLE 4

| No. | Sealed conditions | Result of checking |
|---|---|---|
| 1 | No defect observed. | ◉ |
| 2 | No defect observed | ◉ |

TABLE 4-continued

| No. | Sealed conditions | Result of checking |
|---|---|---|
| 3 | No defect observed. | ◯ |
| 4 | No defect observed. | ⊚ |
| 5 | No defect observed. | ◯ |
| 6 | No defect observed. | ◯ |
| 7 | No defect observed. | ⊚ |
| 8 | No defect observed. | ⊚ |
| 9 | No defect observed. | ⊚ |
| 10 | No defect observed. | ⊚ |
| 11 | No defect observed. | ⊚ |
| 12 | No defect observed. | ⊚ |
| 13 | No defect observed. | ⊚ |
| 14 | No defect observed. | ⊚ |
| 15 | No defect observed. | ⊚ |
| 16 | No defect observed. | ⊚ |
| 17 | A small hole in every sealed portion. | x |
| 18 | A small hole in every sealed portion. | x |
| 19 | A small hole in every sealed portion. | x |
| 20 | A small hole in every sealed portion. | x |
| 21 | A small hole in every sealed portion. | x |
| 22 | A small hole at the center of seal, and cracks in honeycomb. | x |
| 23 | Gaps in corners of seal. | x |
| 24 | Gaps in corners of seal, and cracks in honeycomb. | x |

(Notes)
(1) Nos. 17-24 are reference examples.
(2) Evaluations:
⊚; Excellent
◯; Good
x; No good As seen from the above explanation, by the method according to the present invention, drying of the sealing material is commenced immediately after introduction thereof into throughholes of honeycomb bodies, so that highly reliable ceramic filters are obtainable with a simple operation.

While the present invention has been disclosed in its preferred embodiments, it is to be understood that the invention is not limited to the precise disclosure contained herein, but may otherwise be embodied with various changes, modifications and improvements which may occur to those skilled in the art, without departing from the scope of the invention as defined in the appended claims.

What is claimed is:

1. A method for producing a ceramic honeycomb structural body having selectively sealed open end surfaces, comprising the steps of:
   attaching a film or mask on an open end surface of a ceramic honeycomb structural body;
   introducing a ceramic sealing material into through holes of the ceramic honeycomb structural body through apertures provided at selected positions of the film or mask, said sealing material having a viscosity of 50-1,500 poises;
   commencing drying of said sealing material within 2 minutes after the introduction of said sealing material into through holes, said drying being performed by exposing said sealing material to an environment having a temperature of 100°-300° C. for 0.5-3.0 minutes; and
   sintering said ceramic honeycomb structural body to solidify said sealing material.

2. A method as claimed in claim 1, wherein said sealing material has a viscosity of 100-800 poises.

3. A method as claimed in claim 1, wherein said heating means is at least one means selected from the group consisting of a hot air gas burner, an electric nichrome heater, and an infra-red ray heater.

4. A method as claimed in claim 1, wherein a main ingredient of the sealing material is substantially the same as the material of the ceramic honeycomb structural body.

5. A method as claimed in claim 4, wherein the sealing material further comprises a plasticizer and a binder which is readily solidifiable upon heating.

6. A method as claimed in claim 5, wherein the plasticizer is water.

7. A method as claimed in claim 5, wherein the binder is at least one material selected from the group consisting of methyl cellulose, polyvinyl alcohol, carboxymethyl cellulose, starch paste, polyethylene oxide, and combinations thereof.

8. A method for producing a ceramic honeycomb structural body having selectively sealed open end surfaces, comprising the steps of:
   attaching a film or mask on an open end surface of a ceramic honeycomb structural body;
   introducing a ceramic sealing material into through holes of the ceramic honeycomb structural body through apertures provided at selected positions of the film or mask, said sealing material having a viscosity of 50-1,500 poises;
   commencing drying of said sealing material within 1 minute after the introduction of said sealing material into the through holes, said drying being performed by exposing said sealing material to an environment having a temperature of 100°-300° C. for 0.5-3.0 minutes; and
   sintering said ceramic honeycomb structural body to solidify said sealing material.

9. A method as claimed in claim 8, wherein a main ingredient of the sealing material is substantially the same as the material of the ceramic honeycomb structural body.

10. A method as claimed in claim 8, wherein said sealing material has a viscosity of 100-800 poises.

11. A method as claimed in claim 8, wherein said heating means is at least one means selected from the group consisting of a hot air gas burner, an electric nichrome heater, and an infra-red ray heater.

12. A method as claimed in claim 8, wherein the sealing material further comprises a plasticizer and a binder which is readily solidifiable upon heating.

13. A method as claimed in claim 12, wherein the binder is at least one material selected from the group consisting of methyl cellulose, polyvinyl alcohol, carboxymethyl cellulose, starch paste, polyethylene oxide, and combinations thereof.

14. A method as claimed in claim 12, wherein the plasticizer is water.

15. A method for producing a ceramic honeycomb structural body having selectively sealed open end surfaces, comprising the steps of:
   attaching a film or mask on an open end surface of a ceramic honeycomb structural body;
   introducing a ceramic sealing material into through holes of the ceramic honeycomb structural body through apertures provided at selected positions of the film or mask, said sealing material having a viscosity of 50-1,500 poises;
   commencing drying of said sealing material within 0.5 minutes after the introduction of said sealing material into the through holes, said drying being performed by exposing said sealing material to an environment having a temperature of 100°-300° C. for 0.5-3.0 minutes; and sintering said ceramic honeycomb structural body to solidify said sealing material.

16. A method as claimed in claim 15, wherein a main ingredient of the sealing material is substantially the same as the material of the ceramic honeycomb structural body.

17. A method as claimed in claim 15, wherein said sealing material has a viscosity of 100-800 poises.

18. A method as claimed in claim 15, wherein said heating means is at least one means selected from the group consisting of a hot air gas burner, an electric nichrome heater, and an infra-red ray heater.

19. A method as claimed in claim 15, wherein the sealing material further comprises a plasticizer and a binder which is readily solidifiable upon heating.

20. A method as claimed in claim 19, wherein the plasticizer is water.

21. A method as claimed in claim 19, wherein the binder is at least one material selected from the group consisting of methyl cellulose polyvinyl alcohol, carboxymethyl cellulose, starch paste, polyethylene oxide, and combinations thereof.

* * * * *